June 11, 1968   E. H. BICK ETAL   3,387,728
RAM ATTACHMENT FOR TRACTORS
Filed Oct. 27, 1965
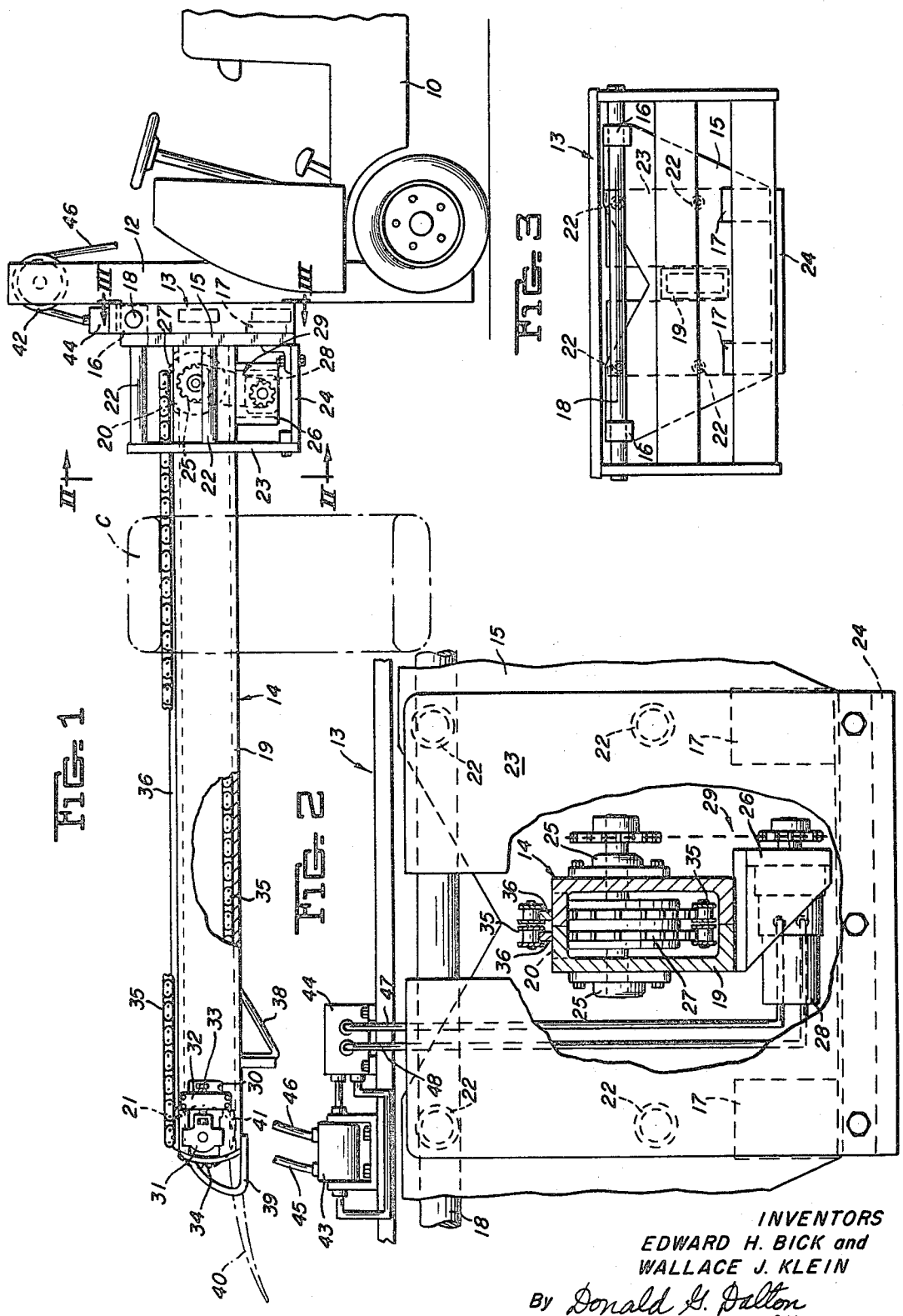
INVENTORS
EDWARD H. BICK and
WALLACE J. KLEIN
By Donald G. Dalton
Attorney

United States Patent Office 3,387,728
Patented June 11, 1968

3,387,728
RAM ATTACHMENT FOR TRACTORS
Edward H. Bick and Wallace J. Klein, Joliet, Ill., assignors to United States Steel Corporation, a corporation of Delaware
Filed Oct. 27, 1965, Ser. No. 505,365
8 Claims. (Cl. 214—620)

ABSTRACT OF THE DISCLOSURE

An attachment installed on the front of a tractor for picking up and transporting annular bundles. The attachment is an elongated ram which supports an endless chain conveyor and a motor for driving the conveyor. The conveyor moves bundles back along the ram to enable the tractor to transport them, and later discharges them from the end of the ram.

---

This invention relates to an improved ram attachment for tractors.

An object of the invention is to provide an improved ram attachment adapted to be installed on a conventional tractor for picking up, transporting, and unloading annular bodies, such as bundles of wire or rod.

A further object is to provide an improved ram attachment of the foregoing type which can pick up annular bodies from either an upright or a flat position and move them back along the length of the ram, thus enabling the tractor to transport several such bodies at one time and subsequently unload them.

A further object is to provide an improved ram attachment which can load and unload annular bodies and can be operated through controls within the tractor, yet is readily removable from the tractor.

In the drawing:

FIGURE 1 is a side elevational view of a portion of tractor equipped with our improved ram attachment;

FIGURE 2 is a vertical section on a larger scale on line II—II of FIGURE 1 with parts broken away; and FIGURE 3 is a vertical section on line III—III of FIGURE 1.

FIGURE 1 shows a portion of a conventional tractor 10 of the type commonly used in a ram or fork truck. The tractor includes a mast 12 at the front, and a box 13 supported for vertical movement on the mast. The tractor is equipped with a conventional hydraulic system (not shown) for raising and lowering the box and tilting the mast. The hydraulic system is operated from controls within the tractor. Box 13 carries a ram attachment 14 constructed in accordance with our invention.

The ram attachment 14 includes a mounting plate 15, the back face of which carries a pair of opposed pivot ears 16 near its upper edge and bearing lugs 17 near its lower edge. A transverse rod 18 extends through the sides of the box 13 and through the pivot ears 16, while the lugs 17 bear against the lower portion of the box, to mount the ram attachment 14 on the tractor 10. The ram attachment can be removed merely by sliding the rod endwise from the box. We weld an elongated hollow boom 19 of rectangular cross section to the front face of plate 15. The top of the boom has openings 20 and 21 near its back and front ends respectively. We also weld a plurality of structural members 22 (conveniently short length pipes or flat bars) to the front face of plate 15. We weld a transverse U-shaped reinforcing plate 23 to the front extremities of these structural members spaced from plate 15. We weld the bottom and sides of the boom to the reinforcing plate 23, which thus assists in bracing the structure. A horizontal plate 24 extends between the lower edges of plates 15 and 23.

The rear portion of boom 19 carries aligned bearings 25 and a depending motor bracket 26 in the space between plates 15 and 23. We journal a double sprocket 27 in bearings 25 projecting through the opening 20 in the top of the boom. We mount a hydraulic drive motor 28 for this sprocket on bracket 26. We connect the motor to the sprocket 27 through a chain-and-sprocket mechanism 29. The side walls of the boom have lengthwise slots 30 near their front ends in which we mount take-up bearings 31 adjustable lengthwise of the boom. The adjusting means includes blocks 32 fixed to the side walls of the boom and extending across the slots, and screws 33 threadedly engaging these blocks and rotatably connected to the bearings. We journal another double sprocket 34 in these bearings projecting through the opening 21 in the boom. We extend an endless double conveyor chain 35 around sprockets 27 and 34. The top of the boom carries guide bars 36 on which the double chain 35 rides to keep the chain in line with the sprockets. The underside of the boom carries a guard or bumper 38 near its front end. The front end of the boom carries a forwardly projecting guard 39. We can mount a removable scoop 40 on the end of the boom extending beyond guard 39. The scoop rests on the guard and it has a shank 41 which fits under the bottom wall of the boom to hold the scoop in position.

We mount a hose reel 42 near the top of mast 12 and a hydraulic swivel block 43 and regulator 44 on the top of box 13. Hydraulic hoses 45 and 46 extend from the swivel block over the reel and are connected to the hydraulic system of the tractor. Additional hoses 47 and 48 connect the regulator 44 with motor 28. It is of course possible to substitute an electric motor for the hydraulic motor we show.

In operation, we move the tractor 10 forward to project the boom 19 of our ram attachment 14 through the central opening of one or more annular bodies C, such as bundles of steel rod. The bundles usually are in an upright position, whereby the scoop 40 is not needed. If the bundles are lying flat, we install the scoop 40 on the end of the boom to pick them up, and if necessary tilt the mast 12 forwardly. We operate motor 28 to drive the sprockets 27 and 34 and chain 35 to move the bundles back along the length of the boom to a desired position. Plate 23 acts as a stop to prevent the bundles from reaching the motor or the chain and sprocket mechanism 29. In this manner we can transport them wherever we wish. To unload the bundles, we operate motor 28 in the opposite direction, whereby chain 35 carries them forward and off the end of the boom.

In a typical application we use our ram attachment for delivering bundles of steel rod to a patenting line. First we pick up several bundles (commonly three) with our ram attachment and carry them to a welding station where the end of one coil is welded to the next to produce a continuous rod of several coils. Next we again pick up the coils and carry them to a pay-off reel which rotates on a vertical axis. We position the end of the boom over the reel and operate the motor in a direction to discharge the bundles. The convolutions of the rod cascade over the reel, which feeds the rod into the patenting line.

While we have shown and described only a single embodiment of our invention, it is apparent that modifications may arise. Therefore, we do not wish to be limited to the disclosure set forth but only by the scope of the appended claims.

We claim:

1. A ram attachment for tractors comprising a plate, means on the back face of said plate for removably mounting the plate on a tractor, a hollow boom fixed to the front face of said plates and having openings in its upper face adjacent each end, a pair of spaced sprockets journaled within said boom near opposite ends thereof and projecting through said openings, an endless conveyor chain extending around said sprockets and lengthwise inside said boom and along the top thereof, and drive means carried by said boom and operatively connected with one of said sprockets for moving said chain lengthwise of the boom.

2. An attachment as defined in claim 1 in which said attachment further comprises guide bars fixed to the top of said boom between said openings, said chain being double and riding on said guide bars to keep it in alignment with said sprockets.

3. An attachment as defined in claim 1 in which the means on the back face of said plate includes a pair of pivot ears near the upper edge and bearing lugs near the lower edge, said ears being adapted to receive a rod which attaches the plate to a box on the tractor, said lugs being adapted to bear against the box.

4. An attachment as defined in claim 1 in which said plate carries a U-shaped reinforcing plate spaced therefrom and connected to said boom to brace the structure.

5. An attachment as defined in claim 1 in which said drive means is a hydraulic motor and further comprising a motor bracket depending from said boom adjacent said plate on which said motor is mounted.

6. An attachment as defined in claim 1 further comprising a take-up bearing adjustable lengthwise of said boom in which one of said sprockets is journaled.

7. An attachment as defined in claim 1 further comprising a guard fixed to the end of said boom opposite said plate, and a scoop removably carried by said guard.

8. The combination, with a tractor which includes a mast and a box supported on said mast for movement up and down, of an attachment as defined in claim 1 mounted on said box.

References Cited
UNITED STATES PATENTS

| | | | |
|---|---|---|---|
| 1,626,555 | 4/1927 | Remde | 214—750 |
| 2,578,802 | 12/1951 | Heidrick et al. | 214—512 |
| 2,684,164 | 7/1954 | Violette | 214—620 |
| 2,818,189 | 12/1957 | Schreck | 214—731 X |
| 3,164,245 | 1/1965 | Juengel | 198—130 X |

GERALD M. FORLENZA, *Primary Examiner.*

R. J. SPAR, *Assistant Examiner.*